US006813933B1

(12) United States Patent
Ketterer et al.

(10) Patent No.: US 6,813,933 B1
(45) Date of Patent: Nov. 9, 2004

(54) METHOD AND DEVICE FOR POSITIONING MEASURING DISPLAYS FOR MEASURING ION CURRENTS

(75) Inventors: Markus Ketterer, Stuttgart (DE); Achim Guenther, Sindelfingen (DE); Juergen Foerster, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/129,690

(22) PCT Filed: Sep. 26, 2000

(86) PCT No.: PCT/DE00/03344

§ 371 (c)(1), (2), (4) Date: Nov. 5, 2002

(87) PCT Pub. No.: WO01/34972

PCT Pub. Date: May 17, 2001

(30) Foreign Application Priority Data

Nov. 8, 1999 (DE) ........................................ 199 53 710

(51) Int. Cl.[7] ................................................ G01L 23/22
(52) U.S. Cl. ....................................... 73/35.08; 123/644
(58) Field of Search ............................. 73/35.08, 117.2; 123/606, 625, 620, 143 B, 644, 609; 324/380, 459, 388, 399

(56) References Cited

U.S. PATENT DOCUMENTS 4,380,989 A * 4/1983 Takaki ........................ 123/644
4,648,367 A 3/1987 Gillbrand et al.
5,675,072 A 10/1997 Yasuda et al.
5,801,534 A * 9/1998 Hohner et al. .............. 324/399
5,814,994 A * 9/1998 Hohner et al. .............. 324/380
5,895,839 A * 4/1999 Takahashi et al. ......... 73/35.08
5,954,024 A * 9/1999 Duhr et al. ................. 123/310
6,011,397 A * 1/2000 Yasuda ........................ 324/388
6,151,954 A * 11/2000 Aoki et al. ................ 73/35.08
6,155,241 A * 12/2000 Hohner et al. .............. 123/625
6,186,129 B1 * 2/2001 Butler, Jr. ................... 123/620

FOREIGN PATENT DOCUMENTS

| | | |
|---|---|---|
| DE | 196 49 278 | 6/1998 |
| DE | 197 00 179 | 7/1998 |
| EP | 0 188 180 | 7/1986 |
| EP | 0 674 103 | 9/1995 |
| EP | 0 810 368 | 12/1997 |
| JP | 10 176595 | 6/1998 |

* cited by examiner

*Primary Examiner*—Edward Lefkowitz
*Assistant Examiner*—Octavia Davis
(74) *Attorney, Agent, or Firm*—Kenyon & Kenyon

(57) ABSTRACT

A method is presented for positioning a measurement window in time for analysis of ionic current signals, detected at internal combustion engines via the electrodes of a spark plug, for an ignition system having an ignition transformer, e.g., a.c. ignition or in a capacitor ignition system or inductive transistor ignition or inductive coil ignition or inductive coil ignition having a limited spark duration, the ignition systems being combined with a measurement device for an ionic current at the secondary winding on the ground side, each spark plug being allocated one ignition transformer, and the detection of the end of a spark and the opening of the measurement window for the ionic current signal taking place as a function of the end of the spark.

10 Claims, 3 Drawing Sheets

METHOD AND DEVICE FOR POSITIONING MEASURING DISPLAYS FOR MEASURING ION CURRENTS

BACKGROUND INFORMATION

The present invention relates to the positioning of a measurement window in time for the analysis of ionic current signals detected on internal combustion engines via the electrodes of a spark plug.

It has long been the practice to use features extracted from the measured ionic current characteristic for monitoring and controlling the combustion process in engines, e.g., internal combustion engines. Examples of this include detection of misfiring, knock detection or regulation of the combustion position.

The measurement window is restricted if the ionic current measurement is performed on an engine via the spark gap of a spark plug. This restriction results from the fact that no ionization current is measurable during the ignition operation due to the superimposed spark current. Methods and devices for ionic current measurement in combination with ignition systems in engines are known from German Patent 196 49 278 and German Patent 197 00 179. Because of the superimposed spark current, the test signal resulting during the ignition operation is not suitable for extraction of combustion information. To prevent incorrect classifications (e.g., in detection of misfiring), the ionic current signal in most known systems is analyzed only within measurement window ranges that explicitly do not include the ignition operation because they are outside the time or angle ranges in which the ignition sparks burn.

There are two known methods for positioning measurement windows, as described in European Patent 0 188 180 B1, for example:

Positioning the measurement window with regard to a fixed crank angle range, which corresponds to a certain piston motion of the cylinder in question.

Positioning the measurement window with regard to the ignition point in time, there being a delay by an applicable period of time to take into account the spark duration and the die-down process.

These methods have in common the fact that the measurement window is positioned in a purely controlled manner. The spark duration varies as a function of physical and engine-related properties. In both methods of positioning the beginning of the measurement window, this requires a complicated application, which must take into account such operating parameters as the rotational speed, load, processing of the mixture, etc. Because of the control of the positioning of the measurement window, the application must be implemented in the sense of a "worst case estimate." In other words, the beginning of the measurement window is placed very late to ensure that the ignition influences will die down in all cases.

However, a worst case application runs counter to the requirements of an ionic current measurement because the earliest possible beginning of the measurement window is to be desired. This is true to a particular extent for operating points having a low load and a high rotational speed, or in engines having a high flow rate of gases in the cylinder, e.g., in engines with direct injection of gasoline, in which there is a targeted charge movement through valves or butterfly valves to adjust a certain inhomogeneous distribution of the mixture in the cylinder.

ADVANTAGES OF THE INVENTION

The core of the present invention is the determination of the actual spark duration through measurement technology and the use of this information for positioning the measurement window. This procedure offers the advantage that not all engine-related and physical influencing factors on the spark duration are taken into account in the application for positioning the measurement window.

The present invention may be used to particular advantage in combination with an ignition system having ignition transformer, e.g., a.c. ignition according to German Patent 197 00 179 or a capacitor ignition system or an inductive transistor ignition or an inductive coil ignition or an inductive coil ignition having a limited spark duration, as described in German Patent Application 196 49 278 A1. The ignition system for an internal combustion engine according to the latter patent specification is combined with a measurement device for ionic current on the secondary winding on the ground side, each spark plug being allocated one ignition transformer.

According to the present invention, the end of the spark is detected and the measurement window is opened for the ionic current signal as a function of the end of the spark. Detection of the spark current and the ionic current in separate branch circuits is particularly advantageous for separation of ignition spark current influences and the actual ionic current signal. To reduce the equipment complexity, however, it is also possible to detect the spark current and the ionic current in the same branch circuit. In the latter embodiment, the distinction between ionic current and spark current is made on the basis of a threshold value for detecting the end of the spark. In systems having alternating spark current, it is advantageous for the signal to undergo rectification and low-pass filtering before being compared with the end-of-spark detection threshold. It is also advantageous for a measurement window for the ionic current to be opened only after an applicable lag time, which depends on the ignition system, with respect to the end of the spark detected. This lag time is determined essentially by the system. It is subject to only minor statistical variation in comparison with the spark duration. Thus, the procedure according to the present invention always guarantees a maximally early beginning of the measurement window. Switching an amplifier stage after the end of the spark has the advantageous effect that the full signal stroke is again available for the ionic current measurement. The period of time during which the signal exceeds the threshold for detection of the spark current permits a conclusion regarding faults in the ignition system. In the case of inductive ignition systems, the information regarding the spark burning period is used to advantage to adapt the ignition energy adaptively to the actual demand. To reduce circuit complexity, it is advantageous to combine a number of ignition coils on the ground-side end of the secondary winding.

This method is needed in ignition systems in which the spark duration is not defined precisely. This is mainly the case in inductive ignition, but information about the actual end of the spark may also be of interest in ignition systems in which the spark duration may be varied, because the required information is generated locally.

Embodiments of the present invention are described below with reference to the figures. Two implementations which permit detection of the end of the spark are presented below for detection of the spark current by measurement technology. The explanation is based on FIGS. 1 through 3.

Figure 1:
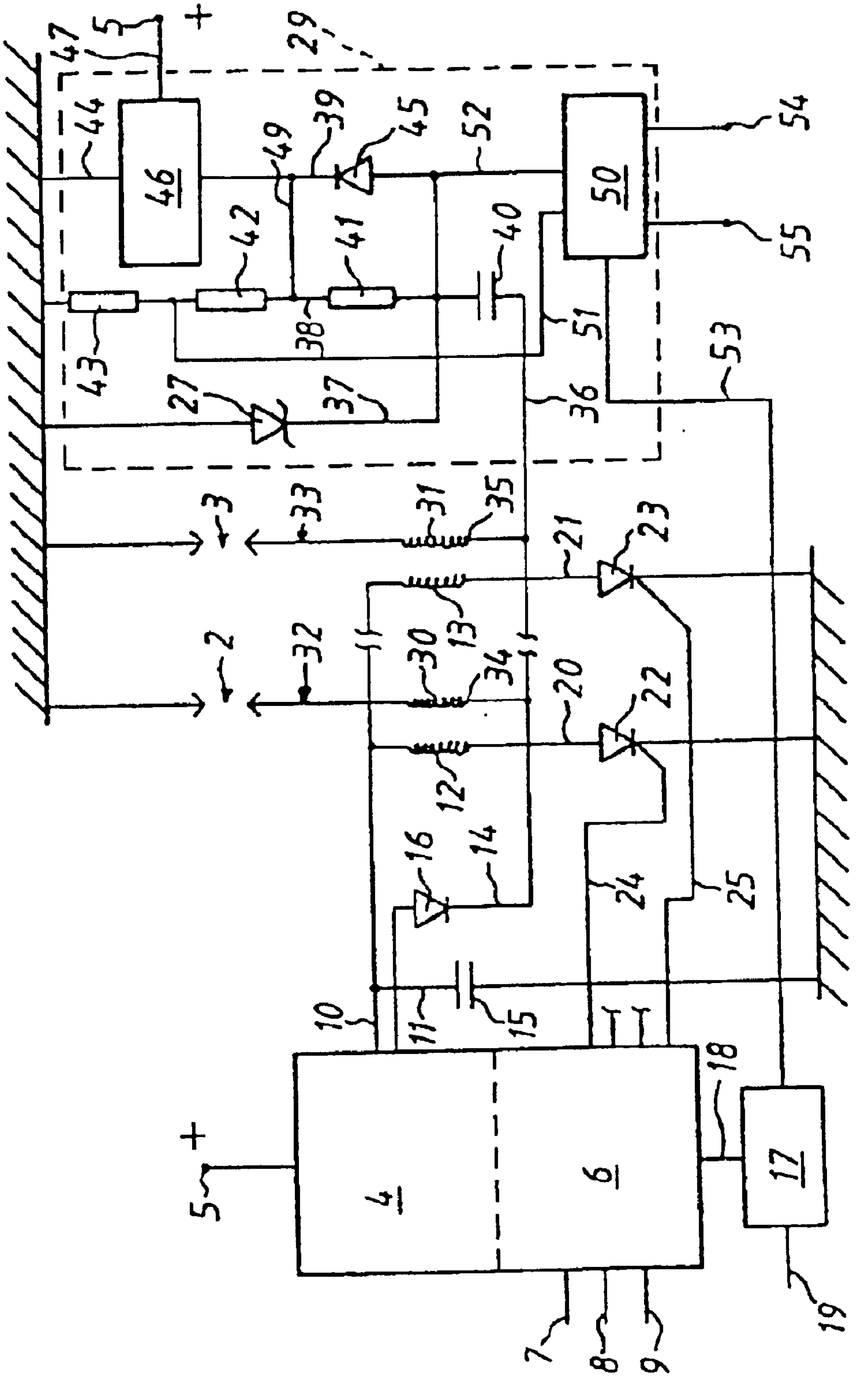
FIG. 1 shows an inductive ignition system having an analysis in two branch circuits.

The number of branch circuits in which ionic current and spark current are measured is used as a differentiating feature for the different systems. If there is only one branch circuit, the ionic current and the spark current are measured at the same location. If there are two branch circuits, then the ionic current and the spark current may each be measured separately of one another in one branch circuit. An inductive ignition system 5, as illustrated in FIG. 1, is presented as an embodiment having multiple branch circuits. Like traditional inductive ignition systems, transistor $T_1$ is first switched to a low resistance by control signal $S_1$ by engine control unit 1. The magnetic field is built up in primary coil $L_1$ and thus charges up ignition coil $ZS_1$ with power. When transistor $T_1$ is switched to a high resistance, the current flow in the primary side of ignition coil $L_1$ is interrupted. However, the field continues to drive a current into the primary side and the secondary side, which leads to a voltage supply on the primary side and the secondary side according to the transformation ratio of ignition coil $ZS_1$. Once the ignition voltage has been reached, spark-over of an ignition spark occurs in spark plug $ZK_1$. Spark current $i_1$ flows over: ground, $R_1$, $D_1$, $ZS_1$ and $ZK_1$ and back to ground.

The ionic current measurement takes place in ionic current measurement device 3, for example. In the device having separate branch circuits, a negative potential occurs at $v_1$ with a positive current direction according to current direction arrow $i_1$. This potential is preferably set by spark current measurement device 4 so that the limits of the power supply of end-of-spark detection unit 2 are not exceeded. Since Zener diode $D_2$ limits the voltage across $R_1$ accordingly, this requirement is easily met. In the case of negative spark currents against current direction $i_1$, the method operates accordingly with respect to the positive power supply of end-of-spark detection unit 2.

If the end of the spark is detected by end-of-spark detection unit 2 by the fact that voltage level $V_1$ goes from a potential close to the positive or negative power supply back to ground, this information (end of spark) is forwarded on signal line $S_2$.

The second branch circuit ground, $U_m$, $R_m$, $L_2$, $ZK_1$ and back to ground is used to measure the ionic current in current direction $i_2$.

If one does not want to have the complexity of the separate branch circuits, then the spark current may be derived from the ionic current signal itself by using a device having only one branch circuit.

Figure 2:
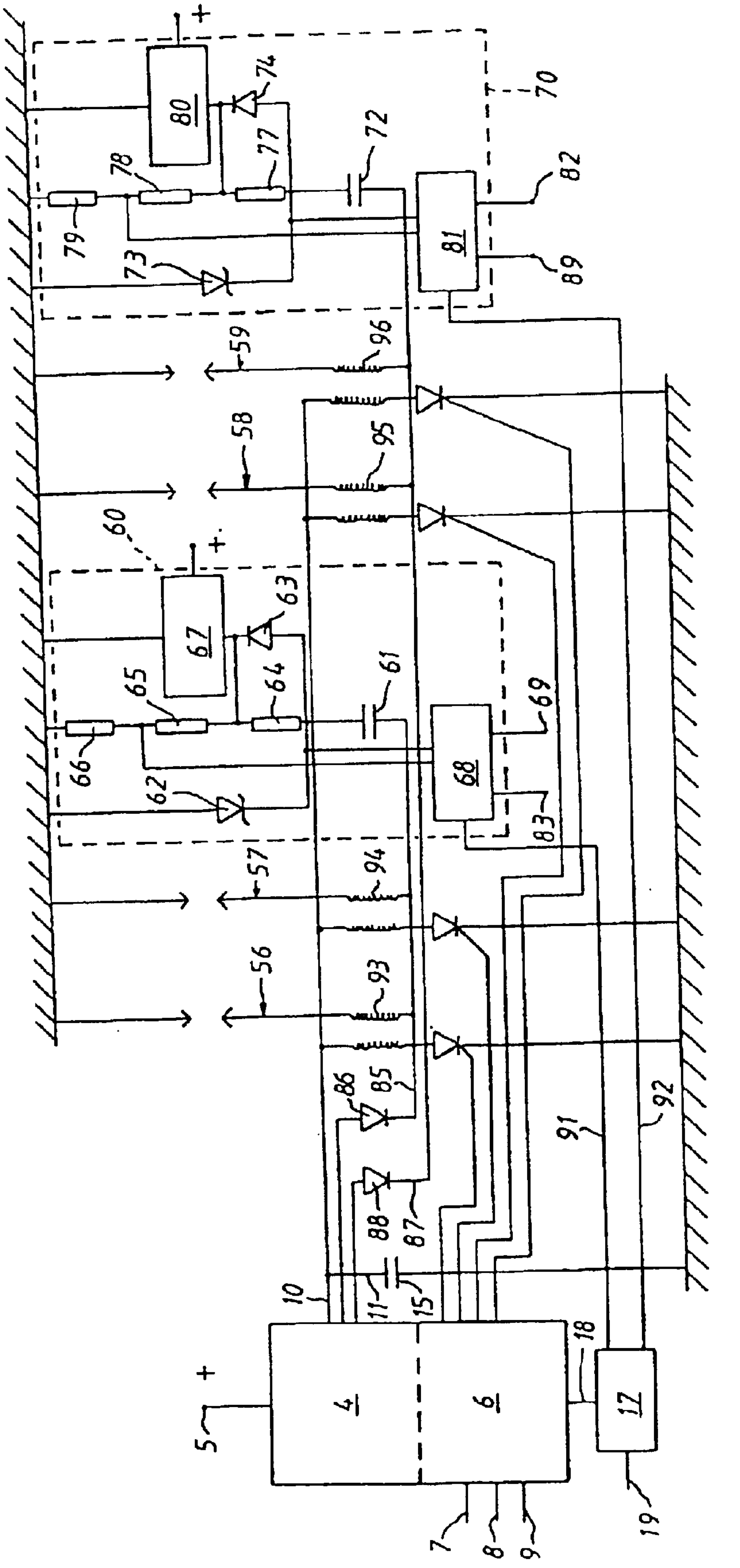
FIG. 2 shows an example of the characteristic of an ionic current signal $Si_1$.
Figure 3:
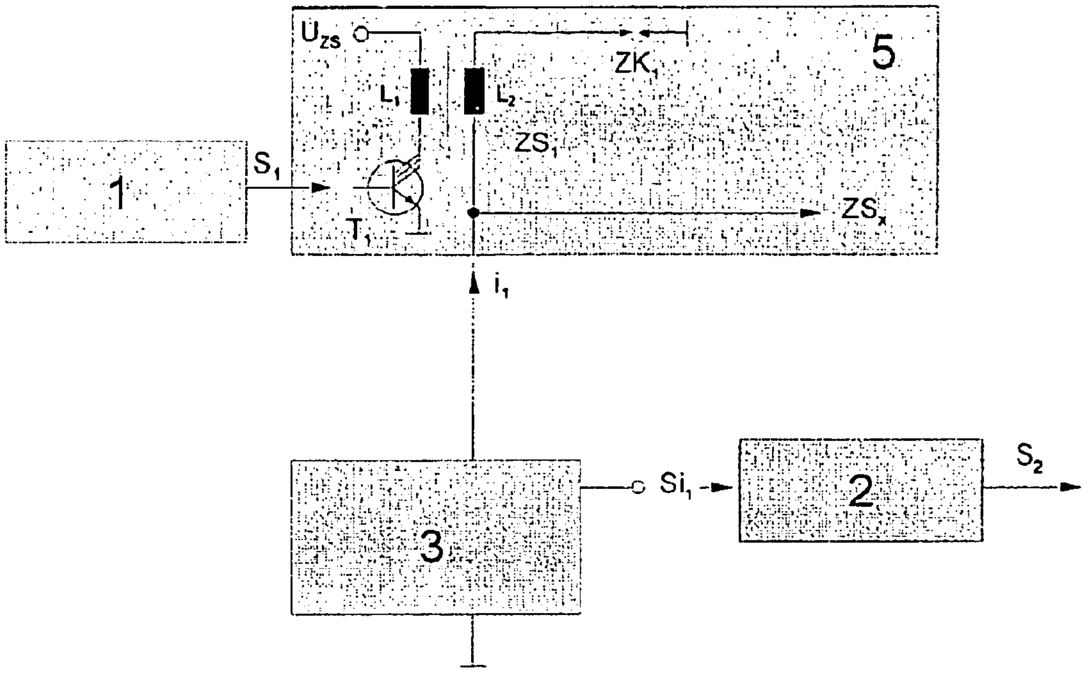
FIG. 3 illustrates an embodiment in which the analysis is performed in one branch circuit.

FIG. 2 shows an example of this signal ionic current signal $Si_1$, where the direction of the spark current (positive or negative) is not of crucial importance. FIG. 2 shows a positive current direction according to the illustration in FIG. 1. Signal $Si_1$ is picked up at $R_m$. This means that spark current measurement device 4 in FIG. 1 may be omitted. $D_1$ is connected directly to ground (see FIG. 3). Then the ionic current and the spark current are measured on the same branch circuit. During the spark, ionic current measurement device 3 is controlled to a greater extent by the spark current than is the case with ionic currents. This state of affairs is utilized to measure the spark duration. The signal is compared by end-of-spark detection unit 2 with a threshold value $Th_1$, If the signal falls below threshold value $Th_1$, the spark is at an end.

However, it is necessary to guarantee that the signal characteristics of the ionic currents will always remain below detection threshold $Th_1$. This may be guaranteed through an appropriate choice of the amplification of the spark current and ionic current $i_2$. One disadvantage of this method is that the resolution for the ionic current signal drops somewhat, because now the ionic current signal and the signal for the spark current must share the maximum analysis voltage range.

Formation of the measurement window

After the end of the spark, the beginning of the measurement window is generated with reference to signal $S_2$. On the basis of vibrations in the ignition system, it is advantageous to wait for a lag time to pass during which the ignition system stabilizes, so that the measurement is not disturbed. This time is to be adapted to the ignition system used.

The measurement window is closed again as a function of the closing point in time or the ignition point in time in an angle or time dependence.

Other applications:

The information regarding the spark duration may also be used to advantage for other applications in addition to positioning of the measurement window:

Example of power regulation: The spark duration, i.e., the time during the breakdown and glow phases of the ignition spark, is responsible to a great extent for the progress in development of the flame core and thus for the quality of combustion. To guarantee reliable ignition, it is necessary to provide a minimum spark duration. On the other hand, if the spark duration is too long, this leads to an unnecessarily high power loss and to a reduction in the useful life of the spark plugs.

With the method presented here for detection of the spark duration by measurement technology, it is easily possible to adjust the (average) spark duration to a desired level by varying the closing angle duration (power regulation).

Example of ignition coil diagnosis and misfiring detection: The presence of a (minimum) spark duration provides direct information regarding the fact that the ignition coil voltage has exceeded the spark breakdown voltage and an ignition spark has been delivered. For example, when the ignition coil is defective (e.g., winding short circuit), the secondary voltage does not reach the spark voltage demand and there is no sparkover. The spark current detected by the method according to the present invention is thus suitable for detection of misfiring or a diagnosis of the ignition coil.

What is claimed is:

1. A device for analyzing ionic current signals occurring at electrodes of at least one spark plug in an internal combustion engine, the internal combustion engine including an ignition system having an ignition transformer for each of the at least one spark plug, each ignition transformer including a secondary winding, the device comprising:

an ionic current measurement device at the secondary winding on a ground side of the ignition transformer, the ionic current measurement device having a measurement window within which the ionic current signal is detectable and an end-of-spark detection unit configured to supply an end-of-spark signal at the end of a spark, an opening of the measurement window occurring after occurrence of the end-of-spark signal.

2. The device of claim 1, further comprising:

a spark current measurement device configured to detect a spark current;

wherein the end-of-spark detection unit is configured to analyze the spark current detected by the spark current measurement device.

3. The device of claim 2, wherein the spark current measurement device and the ionic current measurement device are situated in separate branch circuits.

4. The device of claim 2, wherein the spark current measurement device and the ionic current measurement device are situated in a single branch circuit.

5. The device of claim 4, wherein the ionic current signal and the spark current are differentiated using a threshold value.

6. The device of claim 5, if the spark current is alternating, the spark current is rectified and low-pass filtered before being compared to the threshold value.

7. The device of claim 1, wherein the measurement window is opened after a lag time based on a state of the ignition system after the occurrence of the end-of-spark signal.

8. The device of claim 1, further comprising:

an amplifier stage, the amplifier stage being switched after the occurrence of the end-of-spark signal so that a full signal excursion is available for the ionic current measurement device.

9. The device of claim 2, wherein faults in the ignition system are determined based upon a period of time during which the spark current detected by the spark current measurement device exceeds a threshold value.

10. The device of claim 1, wherein at least two of the ignition transformers are coupled on the ground-side of their respective secondary windings.

* * * * *